(12) United States Patent
Christian

(10) Patent No.: US 8,057,962 B2
(45) Date of Patent: Nov. 15, 2011

(54) TUNGSTEN-BASED ELECTROCATALYST AND FUEL CELL CONTAINING SAME

(75) Inventor: Joel B. Christian, Towanda, PA (US)

(73) Assignee: Global Tungsten & Powders Corp., Towanda, PA (US)

(*) Notice: Subject to any disclaimer, the term of this patent is extended or adjusted under 35 U.S.C. 154(b) by 1093 days.

(21) Appl. No.: 10/550,465

(22) PCT Filed: Mar. 25, 2004

(86) PCT No.: PCT/US2004/009019
§ 371 (c)(1),
(2), (4) Date: Jul. 11, 2006

(87) PCT Pub. No.: WO2004/088780
PCT Pub. Date: Oct. 14, 2004

(65) Prior Publication Data
US 2006/0257716 A1    Nov. 16, 2006

Related U.S. Application Data

(60) Provisional application No. 60/320,056, filed on Mar. 26, 2003.

(51) Int. Cl.
*H01M 4/02* (2006.01)
*B01J 23/16* (2006.01)

(52) U.S. Cl. .......................... 429/528; 502/101; 502/305

(58) Field of Classification Search .................. None
See application file for complete search history.

(56) References Cited

U.S. PATENT DOCUMENTS

| | | | |
|---|---|---|---|
| 3,077,385 A | 2/1963 | Robb | 23/208 |
| 3,480,470 A | 11/1969 | Nestor | 136/86 |
| 3,507,701 A * | 4/1970 | Broyde | 429/13 |
| 3,615,840 A | 10/1971 | Wolfe | 136/86 D |
| 3,784,421 A | 1/1974 | Craig | 149/29 |
| 3,848,062 A | 11/1974 | Steiger et al. | 423/440 |
| 3,902,917 A | 9/1975 | Baresel et al. | 136/86 |
| 3,907,600 A | 9/1975 | Pohl et al. | 136/121 |
| 3,943,005 A | 3/1976 | Mund | 136/120 |
| 4,232,097 A | 11/1980 | Shanks et al. | 429/44 |
| 4,316,944 A | 2/1982 | Landsman et al. | 429/44 |
| 4,325,843 A | 4/1982 | Slaugh et al. | 252/443 |
| 4,339,424 A | 7/1982 | Jacobson et al. | |

(Continued)

FOREIGN PATENT DOCUMENTS

CA    2421838    4/2002

(Continued)

OTHER PUBLICATIONS

J.B. Claridge et al., New Catalysts for the Conversion of Methane to Synthesis Gas: Molybdenum and Tungsten Carbide, *J. Catalysis*, 180, 85-100 (1998).

(Continued)

*Primary Examiner* — Barbara Gilliam
*Assistant Examiner* — Kwang Han
(74) *Attorney, Agent, or Firm* — Ballard Spahr LLP

(57) ABSTRACT

The catalyst of this invention is a non-stoichiometric tungsten compound, $H_{0.53}WO_3$, which may be used as both the anode and cathode electrocatalyst for acid-style low-temperature fuel cells. A fuel cell using the tungsten-based electrocatalyst as both the anode and cathode has been constructed and operated with a hydrogen fuel and an air oxidant.

7 Claims, 4 Drawing Sheets

U.S. PATENT DOCUMENTS

| | | | | |
|---|---|---|---|---|
| 4,430,170 | A | 2/1984 | Stern | 204/39 |
| 4,481,303 | A | 11/1984 | McIntyre et al. | 502/159 |
| 4,702,784 | A | 10/1987 | Naoumidis et al. | 156/89 |
| 4,910,181 | A | 3/1990 | Angevine et al. | |
| 4,990,372 | A | 2/1991 | Sunder et al. | 427/237 |
| 5,277,987 | A | 1/1994 | Garg et al. | 428/457 |
| 5,298,343 | A | 3/1994 | Savadogo et al. | 429/44 |
| 5,470,673 | A * | 11/1995 | Tseung et al. | 429/44 |
| 5,922,488 | A * | 7/1999 | Marucchi-Soos et al. | 429/44 |
| 5,939,220 | A | 8/1999 | Gunner et al. | 429/40 |
| 5,945,231 | A | 8/1999 | Narayanan et al. | 429/30 |
| 5,993,506 | A | 11/1999 | Kobayashi et al. | 75/240 |
| 6,030,718 | A | 2/2000 | Fuglevand et al. | 429/26 |
| 6,040,077 | A | 3/2000 | Debe et al. | 429/40 |
| 6,183,894 | B1 | 2/2001 | Adzic et al. | 429/13 |
| 6,551,569 | B1 | 4/2003 | Christian et al. | 423/440 |
| 6,656,870 | B2 | 12/2003 | Christian et al. | 502/180 |
| 6,696,184 | B1 | 2/2004 | Christian et al. | 428/698 |
| 7,060,648 | B2 | 6/2006 | Christian et al. | 502/180 |
| 7,727,927 | B2 | 6/2010 | Christian | 502/182 |
| 2002/0111267 | A1 * | 8/2002 | Christian et al. | 502/182 |
| 2003/0059666 | A1 | 3/2003 | Kourtakis | 429/40 |
| 2003/0077460 | A1 | 4/2003 | Christian et al. | 428/440 |
| 2006/0058183 | A1 | 3/2006 | Christian | 502/182 |

FOREIGN PATENT DOCUMENTS

| | | |
|---|---|---|
| CA | 2421838 | 3/2009 |
| CA | 2421838 | 11/2009 |
| EP | 04758265.5 | 3/2006 |
| EP | 04758265.5 | 8/2007 |
| EP | 04758265.5 | 10/2008 |
| WO | PCT/US2001/030557 | 1/2002 |
| WO | PCT/US2004/009019 | 8/2004 |
| WO | PCT/US2004/009019 | 10/2005 |

OTHER PUBLICATIONS

Voorhies, Electrochemical and Chemical Corrosion of Tungsten Carbide (WC), *J. Electrochem. Soc.*, vol. 119, n. 2, pp. 219-222 (1972).
Binder et al., Tungsten Carbide electrodes for Fuel Cells with Acid Electrolytes, *Nature*, 224, 1299-1300 (1969).
Binder et al., Behavior of Tungsten Carbide in Electrodes for Fuel Cells with Acidic Electrolytes, *Energy Conversion*, 10, 25-28 (1970).
L.Bartha et al., Chemistry of Tungsten Oxide Bronzes, *Int. J. Refractory Metals & Hard Materials* 13 (1995) 77-91.
U.S. Appl. No. 09/675,510, filed Sep. 29, 2000.
P. Ross et al., The Relation of Surface Structure to the Electrocatalytic Activity of Tungsten Carbide, *J. Catalysis* 48 (1977).
L. Baudendistel et al., Feul Cell Battery with Non-Noble Metal Electrodes and Acid Electrolyte, *Proc. of the 7th International Energy Conversion Engineering Conf.*, American Chemical Society (Wash. D.C. Sep. 1972) Paper No. 729004.
S. Liu, Electronic Structure of the Hypothetical Electrode Material $PtWO_3$, *Surface Science* 115 (1982) 633-637.
J. Bockris, Electrocatalysis of Oxygen Reduction by Sodium Tungsten Bronze, *J. Electrochem Soc.*, vol. 120, No. 1 (1973) 61-66.
P. Kulesza, Tungtsen Oxides as Active Supports for Highly Dispersed Platinum Microcenters: Electrocatalytic Reactivity Toward Reduction of Hydrogen Peroxide and Oxygen, *J. Electrochem. Soc.*, vol. 144, No. 6 (1997) 1911-1916.
U.S. Appl. No. 11/163,073, filed Jan. 11, 2008, Non-Final Office Action.
U.S. Appl. No. 11/163,073, filed Jan. 17, 2008, Response to Non-Final Office Action Filed.
U.S. Appl. No. 11/163,073, filed Apr. 21, 2008, Non-Final Office Action.
U.S. Appl. No. 11/163,073, filed Oct. 21, 2008, Response to Non-Final Office Action.
U.S. Appl. No. 11/163,073, filed Jan. 28, 2009, Notice of Allowance.
U.S. Appl. No. 11/163,073, filed Apr. 22, 2009, RCE Filed.
U.S. Appl. No. 11/163,073, filed May 12, 2009, Non-Final Office Action.
U.S. Appl. No. 11/163,073, filed Nov. 11, 2009, Terminal Disclaimer Filed.
U.S. Appl. No. 11/163,073, filed Feb. 18, 2010, Terminal Disclaimer Filed.
U.S. Appl. No. 11/163,073, filed Mar. 5, 2010, Notice of Allowance.
U.S. Appl. No. 11/163,073, filed Apr. 8, 2010, RCE Filed.
U.S. Appl. No. 11/163,073, filed Apr. 19, 2010, Notice of Allowance.
U.S. Appl. No. 10/631,302, filed Jul. 31, 2003, Preliminary Amendment.
U.S. Appl. No. 10/631,302, filed Oct. 18, 2004, Non-Final Office Action.
U.S. Appl. No. 10/631,302, filed Mar. 21, 2005, Response to Non-Final Office Action.
U.S. Appl. No. 10/631,302, filed Jun. 7, 2005, Final Rejection.
U.S. Appl. No. 10/631,302, filed Dec. 5, 2005, Notice of Appeal Filed.
U.S. Appl. No. 10/631,302, filed Feb. 3, 2006, Notice of Allowance.
U.S. Appl. No. 10/631,302, filed Apr. 25, 2006, Issue Fee Payment.

* cited by examiner

TUNGSTEN-BASED ELECTROCATALYST AND FUEL CELL CONTAINING SAME

CROSS REFERENCES TO RELATED APPLICATIONS

This application claims the benefit of U.S. Provisional Application No. 60/320,056, filed Mar. 26, 2003.

TECHNICAL FIELD

This invention relates to electrocatalysts for fuel cells. More particularly, this invention relates to tungsten-based electrocatalysts for low-temperature fuel cells.

BACKGROUND ART

Fuel cells produce electricity by converting reactants such as hydrogen, hydrocarbons, and oxygen into products such as water and carbon dioxide. In its simplest form, a fuel cell comprises an anode and cathode separated by an electrolyte. The anode and cathode consist of a conductive support, usually carbon black, having a thin layer of a platinum catalyst that is uniformly dispersed over the surface of the support. In a proton-exchange membrane (PEM) fuel cell, the electrolyte is a solid polymeric material capable of conducting protons, e.g., a perfluorosulfonic acid polymer (e.g., Nafion® by DuPont). Examples of these devices are described in U.S. Pat. Nos. 6,030,718, 6,040,007 and 5,945,231 which are incorporated herein by reference.

During operation, a continuous flow of fuel, e.g., hydrogen, is fed to the anode while, simultaneously, a continuous flow of oxidant, e.g., oxygen or air, is supplied to the cathode. In the case of a hydrogen fuel, hydrogen gas is oxidized with the aid of a platinum catalyst at the anode to generate electrons and protons which travel by separate paths to the cathode. The electrons are conducted through an external circuit and the protons are conducted through the electrolyte. At the cathode, oxygen gas combines with the electrons and protons to produce water, again with the aid of a platinum catalyst. The current generated by the electrons flowing through the external circuit can be used for work.

Platinum catalysts are preferred for fuel cells because of their high electrochemical activity. However, platinum is expensive and easily poisoned by the trace amounts of carbon monoxide typically found in hydrogen fuels. Numerous attempts have been made to find less expensive electrocatalysts or reduce the sensitivity of platinum catalysts to carbon monoxide. Several of these attempts have focused on tungsten and molybdenum compounds, and in particular their carbides and oxides. In 1965, AEG-Telefunken discovered that tungsten carbide could potentially replace platinum as an anode catalyst for acid-style fuel cells. These investigators ran a fuel cell for over 30,000 hours with an anode catalyst composed of tungsten carbide. Since that time, five more tungsten compounds have been identified as potential anode and cathode catalysts for low-temperature acid-style fuel cells: $WC$, $W_2C$, $WO_3$:Pt, $Na_xWO_3$, W-POM. For example, U.S. Pat. No. 5,922,488 describes a CO-tolerant anode catalyst which uses a carbon-supported, platinum-dispersed, non-stoichiometric hydrogen tungsten bronze having the formula $Pt$—$H_xWO_3$ wherein x ranges from about 0.05 to about 0.36. U.S. Pat. No. 5,298,343 describes a polycomponent electrocatalyst comprised preferably of platinum or palladium and a chemical component selected from the group consisting of tungstic acid, molybdic acid, ammonium tungstate, ammonium molybdate, sodium tungstate and sodium molybdate. U.S. Pat. No. 5,945,231 contemplates combining tungsten carbide with ruthenium oxide or ruthenium to form a catalysts for a direct liquid-feed fuel cell. Unfortunately, these tungsten and molybdenum-based catalysts have not been shown to exhibit an acceptable level of electrochemical activity for practical fuel cell application without the additional presence of a platinum group metal (platinum, ruthenium, or palladium) co-catalyst.

SUMMARY OF THE INVENTION

It is an object of the invention to obviate the disadvantages of the prior art.

It is another object of the invention to provide a tungsten-based electrocatalyst for fuel cells.

It is a further object of the invention to provide a fuel cell that has a tungsten-based electrocatalyst that functions as both the anode and cathode catalyst without having to employ a platinum group metal co-catalyst.

In one aspect, the catalyst of this invention is a non-stoichiometric tungsten-based compound, $H_{0.53}WO_3$, which may be used as both anode and cathode electrocatalyst for acid-style low-temperature fuel cells.

In another aspect, the method used to make the catalyst is a novel route to hydrogen tungsten bronze which involves first creating an ammonium bronze, $(NH_4)_{0.33}WO_3$. This material is stable and is formed by heating ammonium metatungstate at about 490° C. in an inert atmosphere. Preferably, the ammonium metatungstate (AMT) is dehydrated prior to heating at about 490° C. Dehydration may be achieved by heating the AMT at a temperature from about 120° C. to about 200° C. Dehydration is complete when the AMT achieves a green color. This method has many practical improvements in the art, including eliminating extra water and oxygen from the compound, and forming a stable intermediate for further catalyst synthesis. This intermediate can also be applied to synthesis for other tungsten-based catalyst applications, including hydrocracking and $NO_x$ control catalysts. The electrocatalytic hydrogen bronze, $H_{0.53}WO_3$, is formed by heating the ammonium bronze in a mixture of hydrogen and an inert gas, e.g., argon.

In a further aspect of the invention, there is provided a fuel cell which employs a tungsten-based electrocatalyst as both the anode and cathode.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

Figure 1:
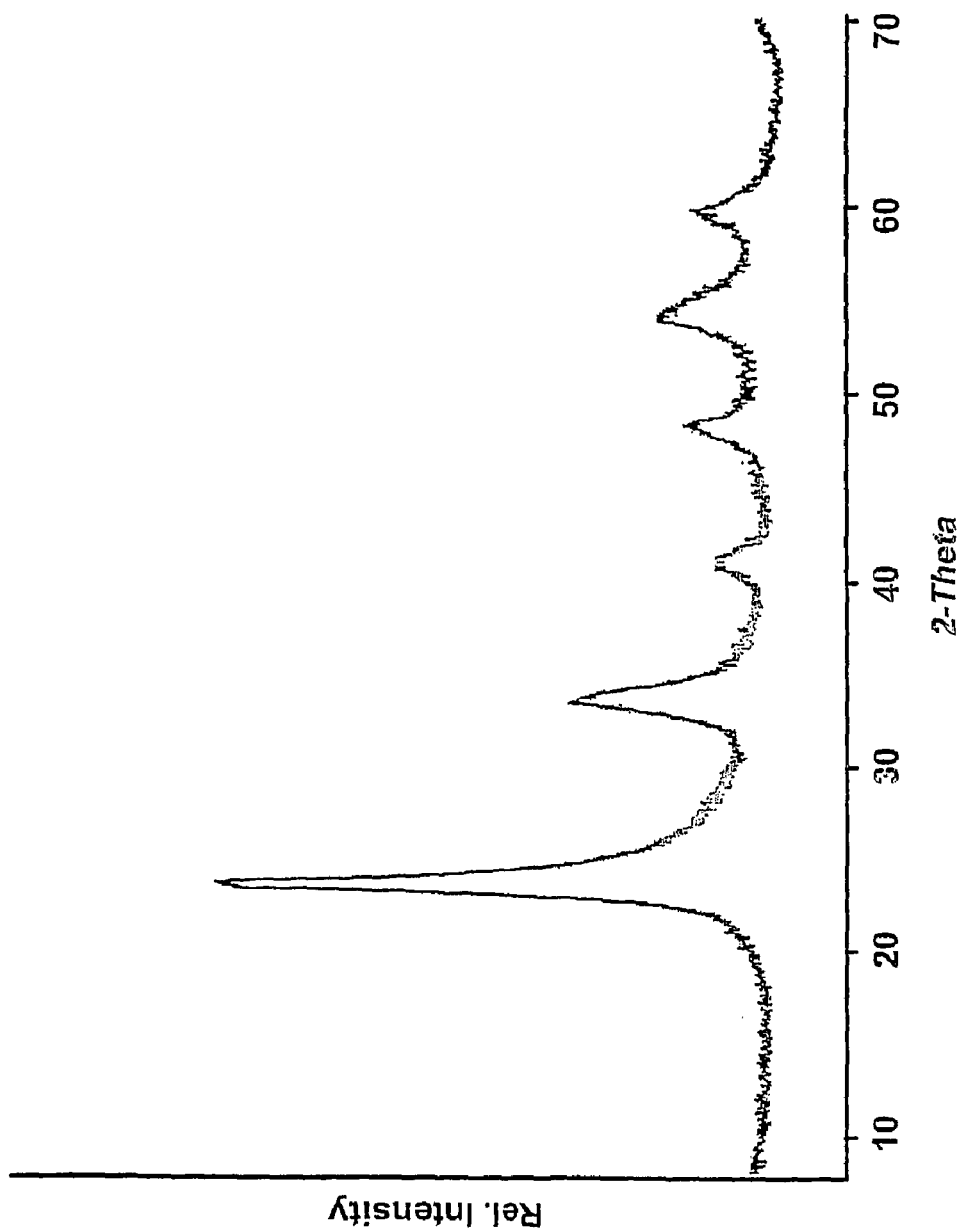
FIG. 1 is an x-ray diffraction pattern of the catalyst of this invention.
Figure 3:
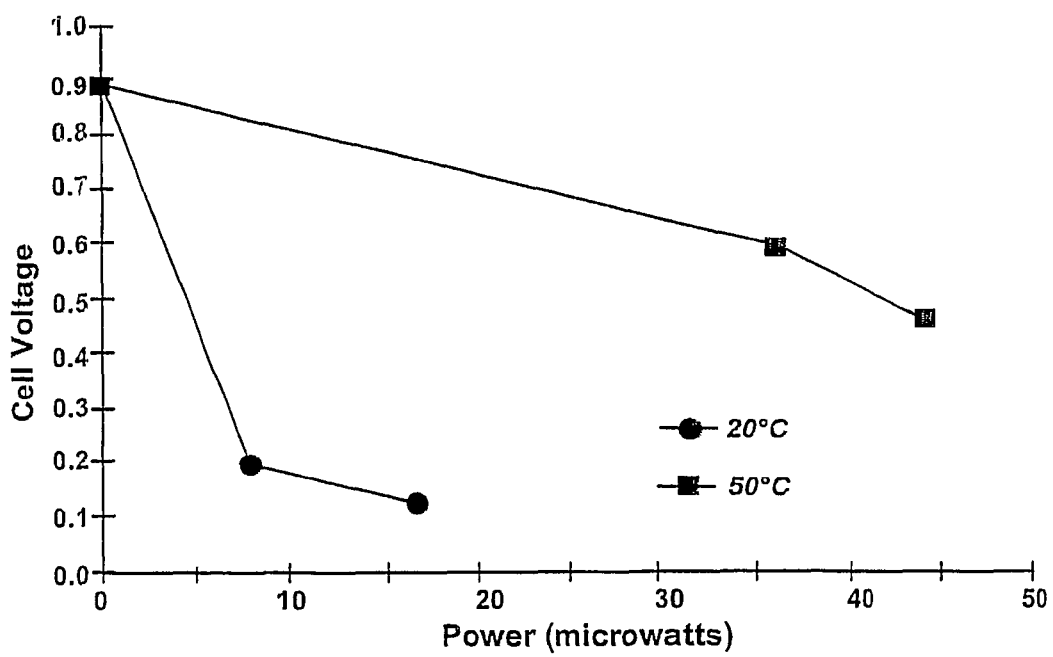
FIG. 3 is a graph of the voltage-power performance of a fuel cell wherein both the anode and cathode are comprised of the tungsten-based catalyst of this invention.

The tungsten-based catalyst of this invention was synthesized and tested by XRD, voltammetry, and fuel cell operation. FIG. 1 shows the X-ray powder diffraction pattern of the carbon-supported tungsten-based electrocatalyst. The diffraction pattern fits the X-ray powder diffraction file, PDF 72-1712, for $H_{0.53}WO_3$. This material creates a unique foundation for electrocatalysis for several reasons: (1) the material is electrically conductive; (2) the structure of the material includes a more open lattice than other tungsten materials; (3) the nonstoichiometric nature creates a mixed-valence compound with complete electron delocalization over the cation ion lattice; and (4) cyclic voltammetry shows that this hydrogen bronze has catalytic behavior for both hydrogen oxidation and oxygen reduction. FIG. 3 shows the performance of a fuel cell wherein both the anode and cathode have been fabricated with the tungsten-based catalyst of this invention.

Figure 5:
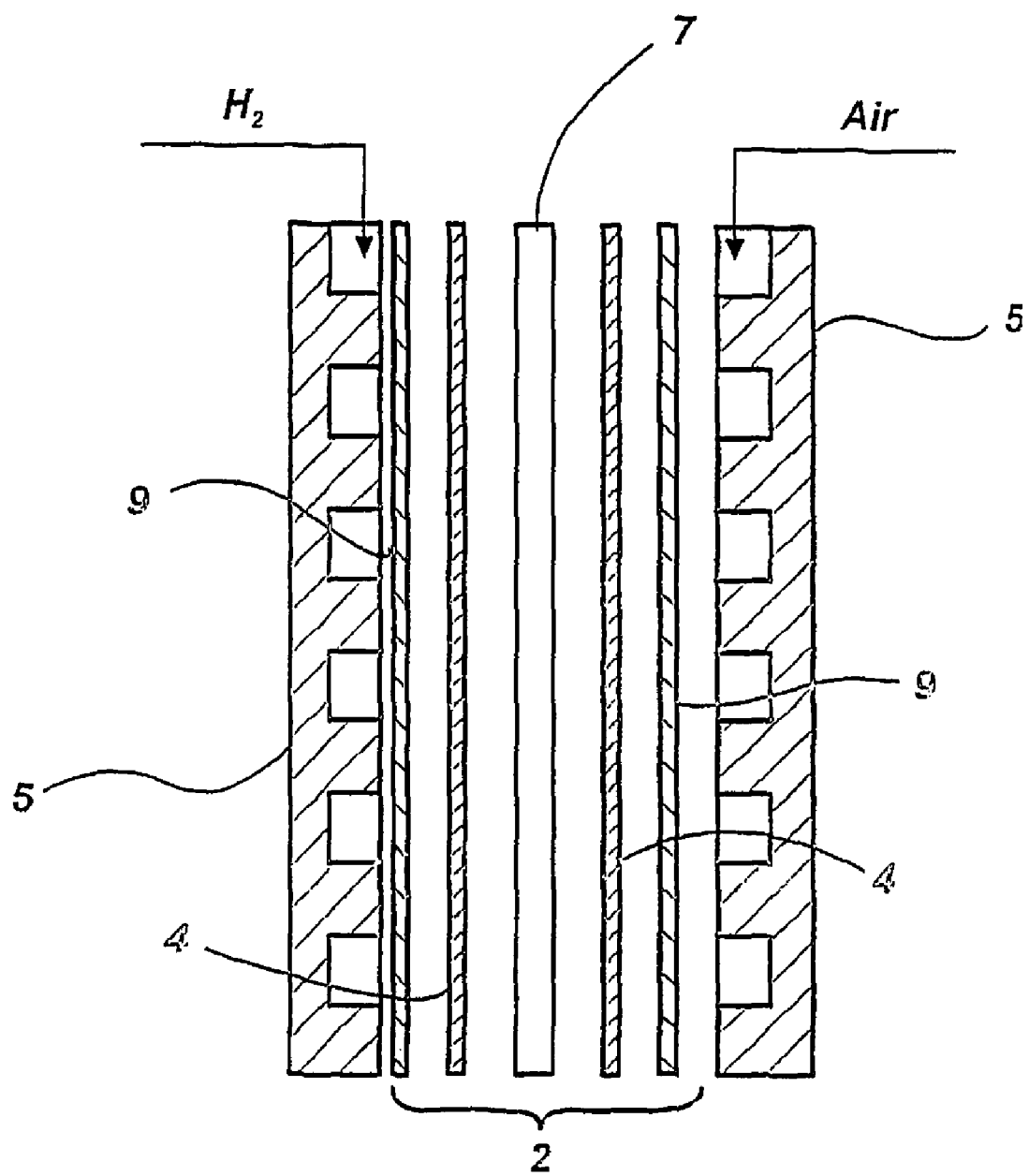
FIG. 5 is an exploded cross-sectional illustration of a PEM-type fuel cell employing the catalyst of this invention.

An exploded cross-sectional illustration of a PEM-type fuel cell employing the catalyst of this invention is shown in FIG. 5. At the center is a polymer membrane 7, preferably a perfluorosulfonic acid polymer (e.g., Nafion® by DuPont). Adjacent to the polymer membrane 7 are the catalyst layers 4. Here, unlike conventional fuel cells, the catalysts layers 4 both contain a tungsten-based electrocatalyst, $H_{0.53}WO_3$, dispersed on a carbon black support, preferably about 20% tungsten by weight. Layers of carbon paper 9 are applied on either side of the catalyst layers 4. The multiple layers are bonded together to form a membrane-electrode assembly 2. Gas distribution plates 5 are used to deliver the $H_2$ fuel and air oxidizer to either side of the membrane-electrode assembly 2.

The following non-limiting examples are presented.

EXAMPLE 1

Three carbon rods (Bay Carbon AGKSP 0.242×12) were soaked in a solution of ammonium metatungstate (AMT) (OSRAM SYLVANIA, catalyst grade, 1600 g/l) for three days. The rods were placed in a 9" Inconel boat, along with a small amount of AMT in a graphite boat as a visual indicator. The boats were placed in a tube furnace and sealed at a pressure of 5 inches water gauge in flowing Argon.

The furnace was heated to 200° C. and held until the AMT powder appeared green, indicating the material had dried. The temperature was raised to 490° C. under argon and held overnight. The samples appeared dark blue, indicating that an ammonium tungsten bronze had formed.

Figure 2:
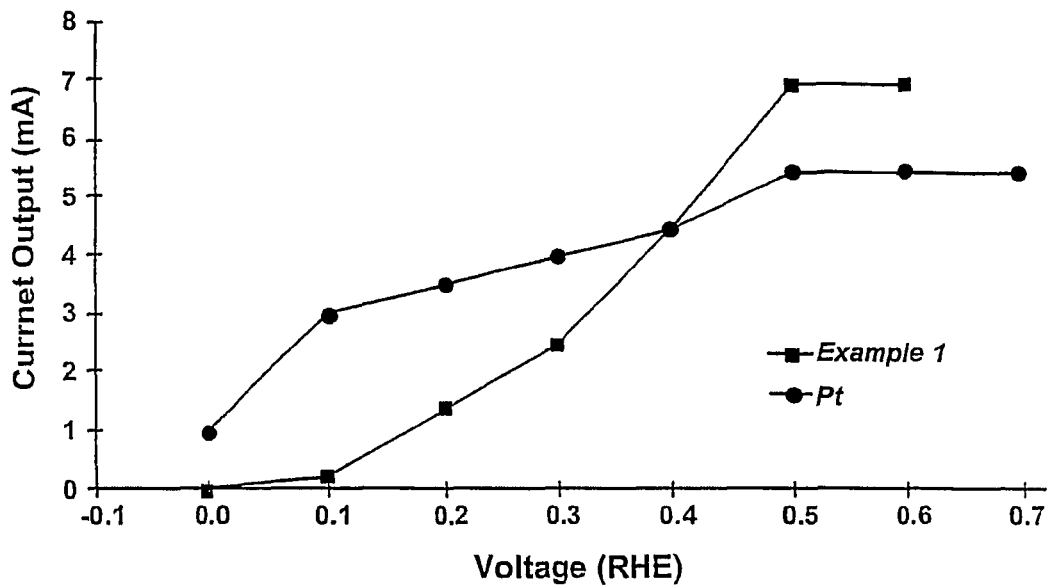
FIG. 2 is a plot of the half-cell performance of the catalyst of this invention.

The gas flow was changed to 1 lpm $H_2$ and 1 lpm Ar to provide a partially reducing atmosphere. The appearance of the material was monitored, and the AMT sample appearance changed color with a moving interface, changing from blue to gray. After 7.5 hours, the furnace was cooled. The furnace was purged and the samples removed for analysis. FIG. 2 shows the anodic half-cell performance characteristic for this sample in 0.5M $H_2SO_4$ in bubbling hydrogen. The performance of a comparatively loaded supported platinum electrode is shown for comparison. The inverted curve of the hydrogen bronze catalyst suggests that the kinetics are slower in the region near zero overpotential, however, mass transfer limited currents (above 0.5V) were similar.

EXAMPLE 2

Four carbon rods (Bay Carbon AGKSP 0.242×12) were soaked in a solution of ammonium metatungstate (AMT) (OSRAM SYLVANIA, catalyst grade, 1600 g/l) for three days. The rods were placed in a 9" Inconel boat, along with two other boats, one ceramic boat containing AMT on a high-surface-area carbon powder (20 wt. % W), Cabot XC-72, and one ceramic boat containing a small amount of AMT as a visual indicator. The boats were placed in a tube furnace and sealed at a pressure of 5 inches water gauge in flowing Argon.

The furnace was heated to 120° C. and held until the AMT powder appeared green, indicating the material had dried. The temperature was raised to 490° C. under argon and held overnight. The samples appeared dark blue, indicating that an ammonium tungsten bronze had formed.

The gas flow was changed to 1 lpm $H_2$ and 3.5 SCFH Ar to provide a partially reducing atmosphere. The appearance of the material was monitored, and the AMT sample appearance changed color with a moving interface, changing from blue to gray. After 1.75 hours, the furnace was cooled. The furnace was purged and the samples removed for analysis. X-ray diffraction of the material from the center boat, which began as AMT on carbon black (20 wt. % W), showed the material to be $H_{0.53}WO_3$.

EXAMPLE 3

Figure 4:
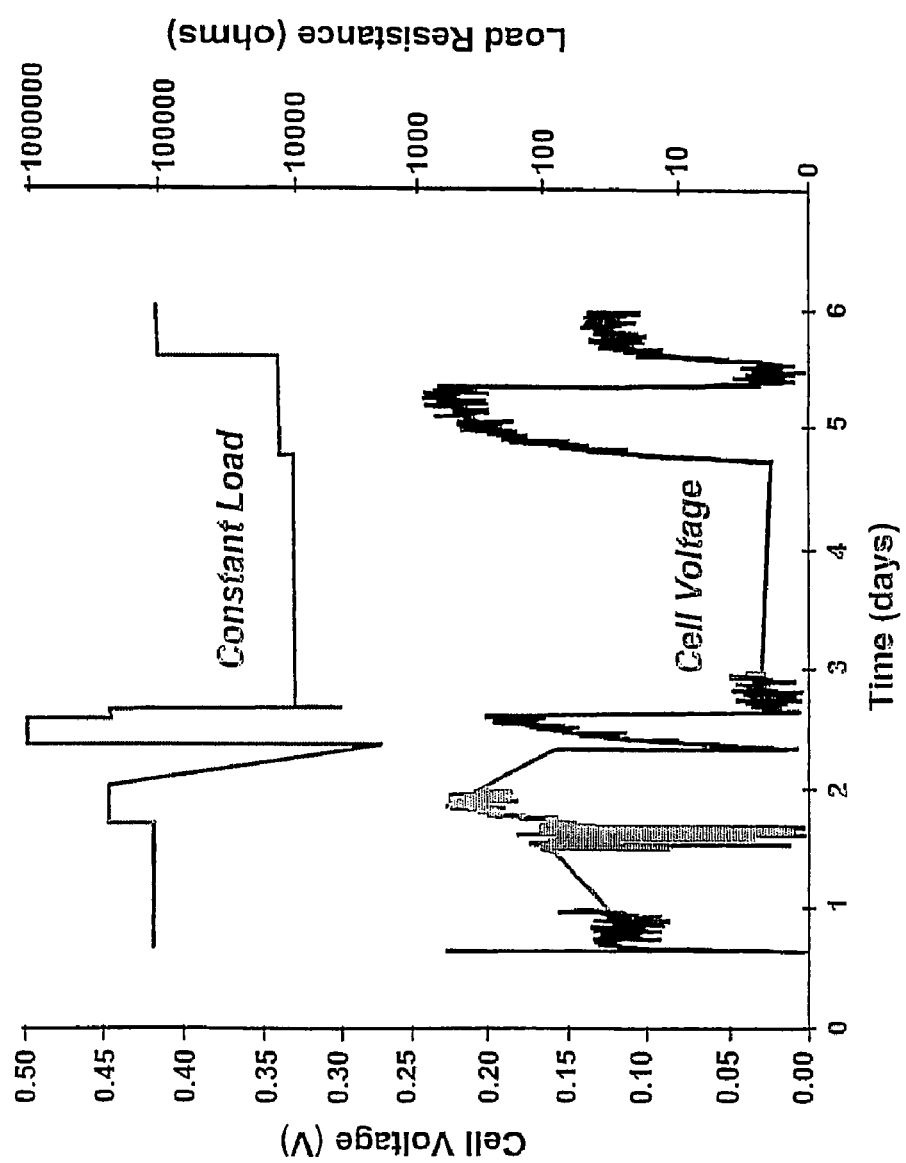
FIG. 4 is a graph of the operational performance of a fuel cell at various resistive loads wherein both the anode and cathode are made with the tungsten-based catalyst of this invention.

The tungsten bronze supported on carbon black from Example 2 was fabricated into a 5 cm² membrane electrode assembly (MEA). The cathode and anode were constructed by teflon-bonding the supported tungsten-based catalyst to form a 5-layer MEA with carbon paper and a Nafion® 117 membrane. These were then assembled into a 5 cm² fuel cell and operated with hydrogen and air at room temperature and 50° C. with various fixed resistive loads to obtain the summarized operation curves in FIG. 3. FIG. 4 shows the raw data of applied load and voltage observed over time. Temperature was controlled by heating the cell with surface heaters and a temperature controller with a K-type thermocouple inserted in the cell's thermal well. These results demonstrate that it is possible to construct an operating fuel cell with only a tungsten-based electrocatalyst and without having a platinum group metal in either the anode or cathode.

While there has been shown and described what are at the present considered the preferred embodiments of the invention, it will be obvious to those skilled in the art that various changes and modifications may be made therein without departing from the scope of the invention as defined by the appended claims.

I claim:

1. A fuel cell comprising an anode and a cathode wherein the anode and cathode are comprised of an electrocatalyst which consists essentially of a hydrogen tungsten bronze-based electrocatalyst, and wherein neither the anode nor the cathode comprises a platinum group metal.

2. The fuel cell of claim 1 wherein the hydrogen tungsten bronze-based electrocatalyst is $H_{0.53}WO_3$ dispersed on a carbon black support.

3. The fuel cell of claim 2 wherein the electrocatalyst contains about 20% tungsten by weight.

4. The fuel cell of claim 2 wherein the anode and cathode are separated by a polymer membrane.

5. The fuel cell of claim 4 wherein the polymer membrane is a perfluorosulfonic acid polymer.

6. The fuel cell of claim 5 wherein the fuel cell uses hydrogen as a fuel and air as an oxidant.

7. The fuel cell of claim 1 wherein the fuel cell is a PEM-type fuel cell.

* * * * *